Jan. 26, 1965 H. K. VEBER 3,166,946
DUAL SPEED DRIVE
Filed May 14, 1962 2 Sheets-Sheet 1

INVENTOR:
Hoyt K. Veber,
BY
Bair, Freeman & Molinare
ATTORNEYS.

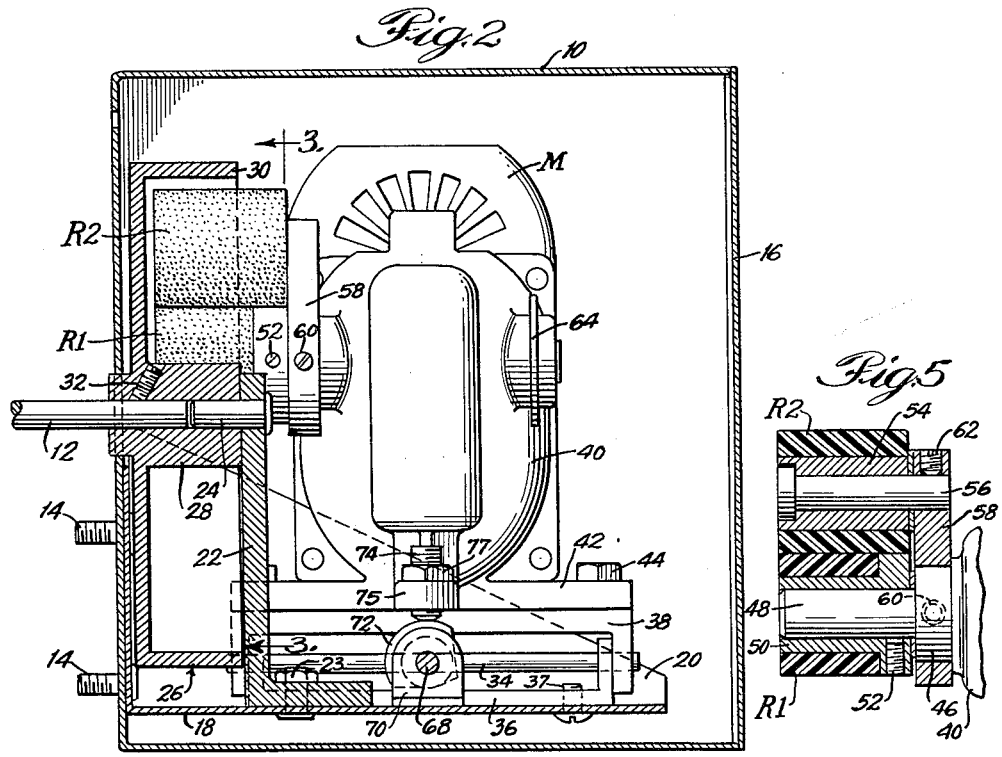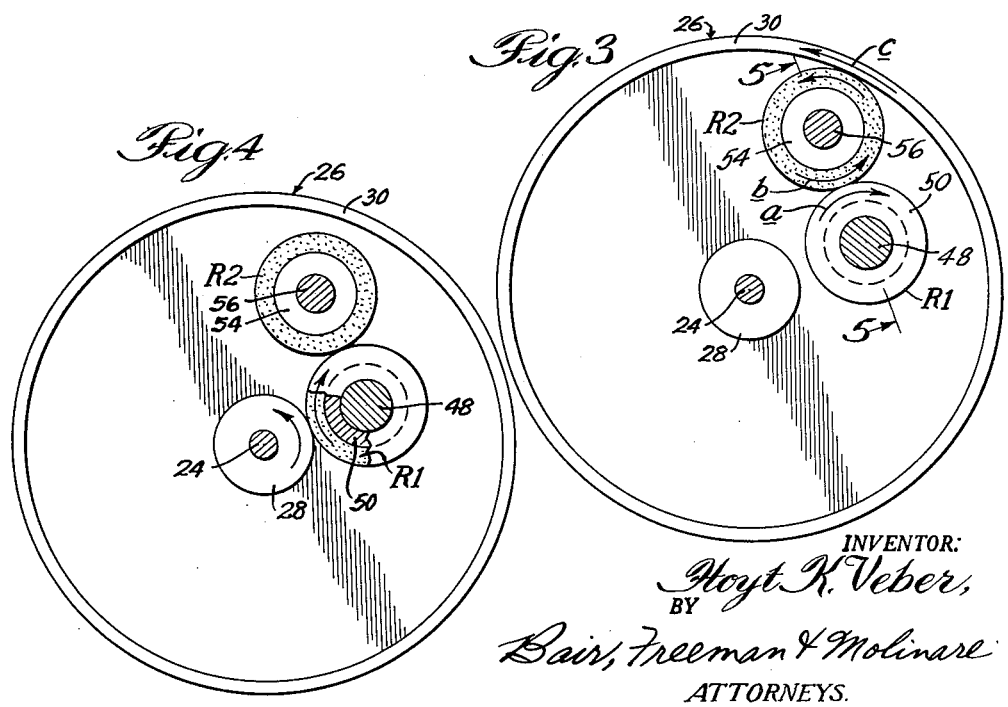

United States Patent Office 3,166,946
Patented Jan. 26, 1965

3,166,946
DUAL SPEED DRIVE
Hoyt K. Veber, Kellogg, Iowa, assignor to Midwest Metal Stamping Company, Kellogg, Iowa, a corporation of Iowa
Filed May 14, 1962, Ser. No. 194,490
4 Claims. (Cl. 74—207)

This invention relates to a dual speed drive whereby an electric motor may be utilized to drive a shaft at two selective speeds but in the same direction of rotation, a simple transmission arrangement being provided between the motor shaft and the driven shaft which facilitates quickly changing from one speed to the other as desired.

One object of the invention is to provide a motor operated unit which may be substituted for a hand crank on a driven shaft of a microfilm reader or the like, the unit being provided with means to shift the unit for either selected speed by means of a manually controlled lever.

Another object is to provide a unit which includes a housing that can be readily mounted on the microfilm reader housing in such a position relative to a hand crank rotated driven shaft thereof that the unit can be connected to the shaft whereupon an electric motor of the unit is utilized to rotate the shaft.

A further object is to provide a transmission mechanism between the motor shaft and the driven shaft in the form of a friction drum having a hub and an outer rim, friction rollers of the unit being driven in opposite directions by the motor through step-down gearing, and means being provided to shift one friction roller into contact with the hub or the other friction roller into contact with the rim, thereby rotating the drum at two different speeds yet in the same direction.

Still a further object is to provide the friction rollers and the motor, together with a step-down gearing housing, mounted as a sub-unit on a pivot whereby the means for shifting from one speed to the other may comprise a cam or the like to tilt the sub-unit with respect to the pivot.

An additional object is to provide a unit of the character disclosed which is comparatively simple and inexpensive to manufacture and which may be mounted on a microfilm reader or the like in a very simple manner.

With these and other objects in view, my invention consists in the construction, arrangement and combination of the various parts of my dual speed drive, whereby the objects above contemplated are attained, as hereinafter more fully set forth, pointed out in my claims and illustrated in detail on the accompanying drawing, wherein:

FIG. 2 is a vertical sectional view on the line 2—2 of FIG. 1.

FIG. 3 is a vertical sectional view on the line 3—3 of FIG. 2, showing my dual speed drive adjusted for low speed.

FIG. 4 is a similar sectional view showing the drive adjusted for high speed, and FIG. 5 is a vertical sectional view on the line 5—5 of FIG. 3 showing details of construction.

Figure 1:
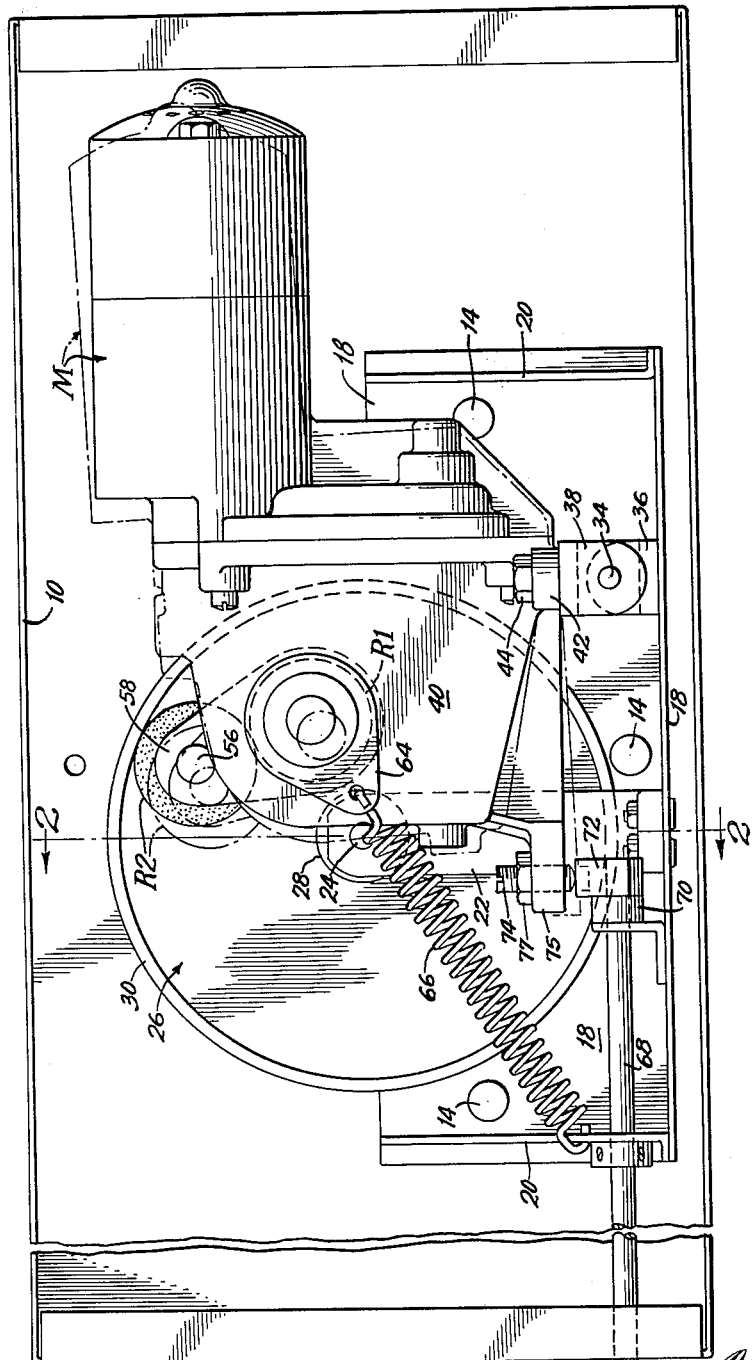
FIG. 1 is a side view of my dual speed drive with the near side panel of the casing removed.

On the accompanying drawings I have used the reference numeral 10 to indicate a five-sided housing formed of sheet metal or the like and provided with a closure panel 16 (omitted from FIG. 1) as its sixth side. A driven shaft 12 is shown in FIG. 2 which may be the normally hand crank driven shaft of a microfilm reader or any other shaft that requires dual speed drive in one direction. Screws 14 are shown for mounting the housing 10 with respect to the reader or other machine from which the driven shaft 12 extends.

Within the housing 10 an L-shaped stationary bracket 18 is provided having a pair of triangular side flanges 20. A bearing bracket 22 is mounted thereon as by bolts 23 and carries a stub shaft 24 on which a drum 26 is rotatably mounted. The drum has a hub 28 at its center and a rim 30 as shown in FIG. 2, and the hub 28 is adapted to be secure to the driven shaft 12 as by a set screw 32.

A pivot rod 34 is supported by a U-shaped bracket 36 secured to the L-shaped bracket 18 by screws 37, and pivoted thereon is a second U-shaped bracket 38 for supporting a step-down gearing housing 40. The housing 40 has feet 42 which are secured to the bracket 38 by screws 44.

The housing 40 has a hub 46 thereon as shown in FIG. 5 from which extends a drive shaft 48, this shaft being the slow speed shaft at the output end of the step-down gearing in the housing 40, the input end of which is connected to the shaft of a motor M. The housing of the motor is secured to the step-down gearing housing 40 as shown in FIG. 1.

A sleeve 50 is mounted on the drive shaft 48 as by a set screw 52 and has a friction roller R1 thereon of suitable resilient material which frictionally engages and drives friction roller R2. The roller R2 is mounted on a sleeve 54 journaled on a stud shaft 56. The shaft 56 is carried by an arm 58 which has one end surrounding the hub 46. Set screws 60 and 62 are used for securing the arm 58 on the hub 46 and the shaft 56 in the arm 58. The friction roller assembly is thereby carried by the housing 40 as is the motor M so that the entire assembly of these elements constitute a sub-unit pivoted in relation to the brackets 18 and 22 for a purpose which will hereinafter appear.

A spring clip 64 is pivoted on the housing 40 and connected by a spring 66 to the left hand flange 20 as shown in FIG. 1 thereby tending to rotate the sub-unit counterclockwise.

A control rock shaft 68 is pivoted in a bearing 70 and in the left hand flange 20 as shown in FIG. 1 and has a cam 72 mounted on the inner end thereof. A cam follower 74 is carried by an extension 75 of the housing 40 and is adjustable, being in the form of a set screw and a lock nut 77 to retain the adjustment. A control lever 76 is mounted on the outer end of the rock shaft 68, and in the position shown in FIGS. 1 and 2 has elevated the extension 75 so that the roller R2 is in contact with the rim 30 of the drum 26 as illustrated in FIG. 3. In this situation and assuming the roller R1 is rotating clockwise as indicated by the arrow $a$, the roller R2 is rotating counterclockwise as indicated by the arrow $b$. Accordingly the rim 30 is driven counterclockwise as indicated by the arrow $c$ and at a relatively low speed because of the internal circumference of the rim 30 being much greater than the circumference of the roller R2.

When the control lever 76 is rotated a quarter turn counterclockwise in FIG. 2 the housing 40 will be rocked counterclockwise in FIG. 1 by the spring 66 whereupon the roller R2 will be in the dot-and-dash line position shown which is the same position it assumes in FIG. 4. In this instance the roller R1 is contacting the hub 28 of the drum 26 and since the hub is of much smaller diameter than the rim 30 the speed will be several times greater than when the parts are in the position shown in FIG. 3.

In a microfilm reader this is an advantage because it is quite often desirable to merely spot-check portions of the film, and transport the film rapidly between the desired spots. When a hand crank is used on the driven shaft 12 the transporting operation is very sluggish whereas my dual speed drive is readily manipulable by the control lever 76 to change from one speed to the other, and by adjusting the cam 72 to an intermediate position where neither the roller R2 nor the roller R1 are in contact with the driven surfaces of the drum 26 the film can be stopped for observation. Thus a considerable saving in time is effected by the use of my dual speed unit in place of the usual hand crank method.

From the foregoing specification it will be obvious that I have provided a relatively simple drive unit of dual speed type which has a comparatively simple transmission means between an actuating motor and a driven shaft drum that can readily be adjusted for either low speed or high speed as desired, yet rotation is always in the same direction.

Some changes may be made in the construction and arrangement of the parts of my dual speed drive without departing from the real spirit and purpose of my invention, and it is my intention to cover by my claims any modified forms of structure or use of mechanical equivalents which may reasonably be included within their scope.

I claim as my invention:

1. In a dual speed drive, a housing adapted to be secured to a device having a driven shaft projecting therefrom, a drum rotatable in said housing and having means of operative connection with the driven shaft, said drum having a hub and a rim, a pair of friction rollers located between said hub and said rim, a step-down gearing housing, said friction rollers being carried thereby, frictionally engaging each other and one thereof being driven from the output shaft of step-down gearing in said step-down gearing housing, a motor for driving the input shaft of said step-down gearing, said motor being mounted on said step-down gearing housing whereby said friction rollers, said housing and said motor form a sub-assembly, said sub-assembly being pivotally mounted in said first housing, and means for selectively pivoting said sub-assembly to engage one of said friction rollers with said hub or the other of said friction rollers with the internal surface of said rim.

2. A dual speed drive comprising a housing adapted to be secured to a device having a driven shaft, a drum rotatable in said housing and having means of operative connection with the driven shaft, said drum having a hub and a rim, a step-down gearing housing, a pair of friction rollers carried thereby, frictionally engaging each other and one thereof being driven from the output shaft of step-down gearing in said step-down gearing housing, a motor for driving the input shaft of said step-down gearing, said step-down gearing housing being pivotally mounted in said first housing, and means for selectively pivoting said step-down gearing housing to engage one of said friction rollers with said hub or the other of said friction rollers with the internal surface of said rim.

3. A dual speed drive comprising a housing, a drum rotatable in said housing and having means of connection with a driven shaft, said drum having a hub and a rim, a pair of friction rollers located between said hub and said rim, a step-down gearing housing pivotally mounted in said first housing, said friction rollers being carried thereby, frictionally engaging each other and one thereof being driven from the output shaft of step-down gearing in said step-down gearing housing, a motor for driving the input shaft of said step-down gearing, said motor being mounted on said step-down gearing housing whereby said last housing, said friction rollers and said motor form a sub-assembly, a cam engageable with said sub-assembly at a point spaced from the pivot of said step-down gearing housing, manually selective means for rocking said cam and thereby pivotally adjusting said sub-assembly to engage one of said friction rollers with said hub or the other with the internal surface of said rim, and spring means to retain said step-down gearing housing in contact with said cam.

4. In a dual speed drive, a housing, a drum rotatable in said housing and having means of connection with a driven shaft, said drum having a hub and a rim, a pair of friction rollers located between said hub and said rim, a step-down gearing housing pivotally mounted in said first housing, said friction rollers being carried thereby, frictionally engaging each other and one thereof being driven from the output shaft of step-down gearing in said step-down gearing housing, a motor for driving said input shaft of said step-down gearing, a cam engageable with said step-down gearing housing, and manually selective means for rocking said cam and thereby pivotally adjusting said step-down gearing housing to engage one of said friction rollers with said hub or the other with the internal surface of said rim.

References Cited in the file of this patent

UNITED STATES PATENTS

| 2,563,649 | Hartman | Aug. 7, 1951 |
| 2,708,851 | Moerk | May 24, 1955 |